(12) United States Patent
Tatourian et al.

(10) Patent No.: US 10,621,213 B2
(45) Date of Patent: Apr. 14, 2020

(54) BIOMETRIC-DATA-BASED RATINGS (71) Applicant: Intel Corporation, Santa Clara, CA (US)

(72) Inventors: Igor Tatourian, Fountain Hills, AZ (US); Rita H. Wouhaybi, Portland, OR (US); Hong Li, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 341 days.

(21) Appl. No.: 14/998,170

(22) Filed: Dec. 23, 2015

(65) Prior Publication Data
US 2017/0185630 A1 Jun. 29, 2017

(51) Int. Cl.
G06F 7/00 (2006.01)
G06F 17/30 (2006.01)
(Continued)

(52) U.S. Cl.
CPC ........ *G06F 16/29* (2019.01); *G06F 16/24578* (2019.01); *G06F 16/436* (2019.01);
(Continued)

(58) Field of Classification Search
CPC ........... G06F 17/30241; G06F 17/3053; G06F 1/163; G06F 21/32; G06F 2221/2111;
(Continued)

(56) References Cited

U.S. PATENT DOCUMENTS 9,288,836 B1 * 3/2016 Clement ............... H04W 84/18
2012/0271121 A1 * 10/2012 Della Torre ........... A61B 5/024
600/301
(Continued)

FOREIGN PATENT DOCUMENTS

JP       2015-064704 A     4/2015
KR     1020130047077 A     5/2013
KR       10-1570432 B1    11/2015

OTHER PUBLICATIONS

International Search Report and Written Opinion dated Feb. 28, 2017 for International Application No. PCT/US2016/062305, 14 pages.

*Primary Examiner* — Hasanul Mobin
(74) *Attorney, Agent, or Firm* — Schwabe, Williamson & Wyatt, P.C.

(57) ABSTRACT

In various embodiments, a biometric rating system ("BRS") may generate ratings based on biometric data. The BRS may receive biometric data, along with location data, from personal devices of a user. The BRS may identify a location at which the biometric data was measured. The BRS may generate one or more ratings associated with the location, such as ratings for a venue or event at the location. The BRS may also perform calibration of the biometric data. For example, the BRS may be configured to partition biometric data measurements into multiple segments to be associated with different locations, different areas at a location, or different portions of an event. The BRS may calibrate biometric data based on activity or social media or proximity data. The BRS may generate a rating based on the calibrated biometric data. Other embodiments may be described and/or claimed.

24 Claims, 9 Drawing Sheets (51) Int. Cl.
  *G06F 16/29* (2019.01)
  *G06F 16/2457* (2019.01)
  *G06Q 30/02* (2012.01)
  *G06Q 50/00* (2012.01)
  *G06F 16/9535* (2019.01)
  *G06F 16/435* (2019.01)

(52) U.S. Cl.
  CPC ..... *G06F 16/9535* (2019.01); *G06Q 30/0201* (2013.01); *G06Q 50/01* (2013.01)

(58) Field of Classification Search
  CPC ...... G06F 19/3487; G06F 3/014; G06F 16/29; G06F 16/4387; G06F 16/436; G06F 16/9535
  See application file for complete search history.

(56) References Cited

U.S. PATENT DOCUMENTS

| | | | |
|---|---|---|---|
| 2012/0290950 A1* | 11/2012 | Rapaport | H04L 51/32 715/753 |
| 2013/0127980 A1* | 5/2013 | Haddick | G06F 3/013 348/14.08 |
| 2013/0278631 A1* | 10/2013 | Border | G02B 27/017 345/633 |
| 2014/0275852 A1* | 9/2014 | Hong | A61B 5/02427 600/301 |
| 2014/0297218 A1* | 10/2014 | Yuen | G01B 21/16 702/141 |
| 2015/0135284 A1 | 5/2015 | Bogard | |
| 2015/0281009 A1 | 10/2015 | Melcher et al. | |
| 2015/0310444 A1* | 10/2015 | Chen | G06Q 20/4016 705/44 |
| 2015/0356093 A1* | 12/2015 | Abbas | G06F 17/30058 707/748 |
| 2016/0253710 A1* | 9/2016 | Publicover | H04W 4/21 705/14.66 |
| 2016/0277424 A1* | 9/2016 | Mawji | H04L 63/1408 |
| 2017/0039339 A1* | 2/2017 | Bitran | G16H 40/63 |
| 2017/0048348 A1* | 2/2017 | Chen | H04L 67/306 |
| 2017/0319074 A1* | 11/2017 | Lim | A61B 5/024 |
| 2019/0361716 A1* | 11/2019 | Ko | H04W 4/80 |

* cited by examiner

BIOMETRIC-DATA-BASED RATINGS

TECHNICAL FIELD

The present disclosure relates to the field of data processing, in particular, to apparatuses, methods and storage media associated with providing ratings for locations based on received biometric data.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With the advent of modern social media and ratings/review services, customers are better able to obtain information about various venues, and events. In particular, customers may wish to obtain ratings/reviews based on personal experiences that other customers may have had with a venue or event. However, obtaining such ratings/reviews is not always a simple matter. A great many opportunities to obtain ratings for venues may be lost because of the transaction cost required to seek out a review site and draft and submit a review. Thus, in many scenarios, customers are only motivated to provide reviews when they have had particularly positive or, more likely, particularly negative, experiences. This can lead to artificially skewed review results, which is less helpful to customers than would be desired.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, a biometric rating system ("BRS") may be configured to generate ratings, such as for review services or social media' services, based on received biometric data. In various embodiments, the BRS may be configured to receive biometric data, such as, but not limited to, heart rate data, from one or more wearable or personal devices of a user. The BRS may be configured to receive the biometric data, along with location data, and to identify a location at which the biometric data was measured. The BRS may be configured to generate one or more ratings associated with the location, such as, for example ratings for a venue at the location or ratings for an event which has taken place at the location.

In various embodiments, the BRS may be configured to perform calibration of the biometric data. For example, the BRS may be configured to partition biometric data measurements into multiple segments to be associated with different locations, different areas at a location, or different portions of an event. For example, if biometric data are measured for a user while the user is having dinner at a restaurant, the biometric data may be partitioned into data associated with: time waiting for a table; time perusing a menu, time ordering, time eating, time paying, and time leaving the restaurant. In various embodiments, the BRS may be configured to calibrate biometric data based on activity (such as physical activity) or social media or proximity data (such as the presence of other persons at the time the biometric data is being measured). In various embodiments, the BRS may be configured to generate a rating associated with the location based on the calibrated biometric data. In some embodiments, the rating may be generated from scratch. In others, the rating may be generated by modifying an existing rating or review associated with the location.

Figure 1:
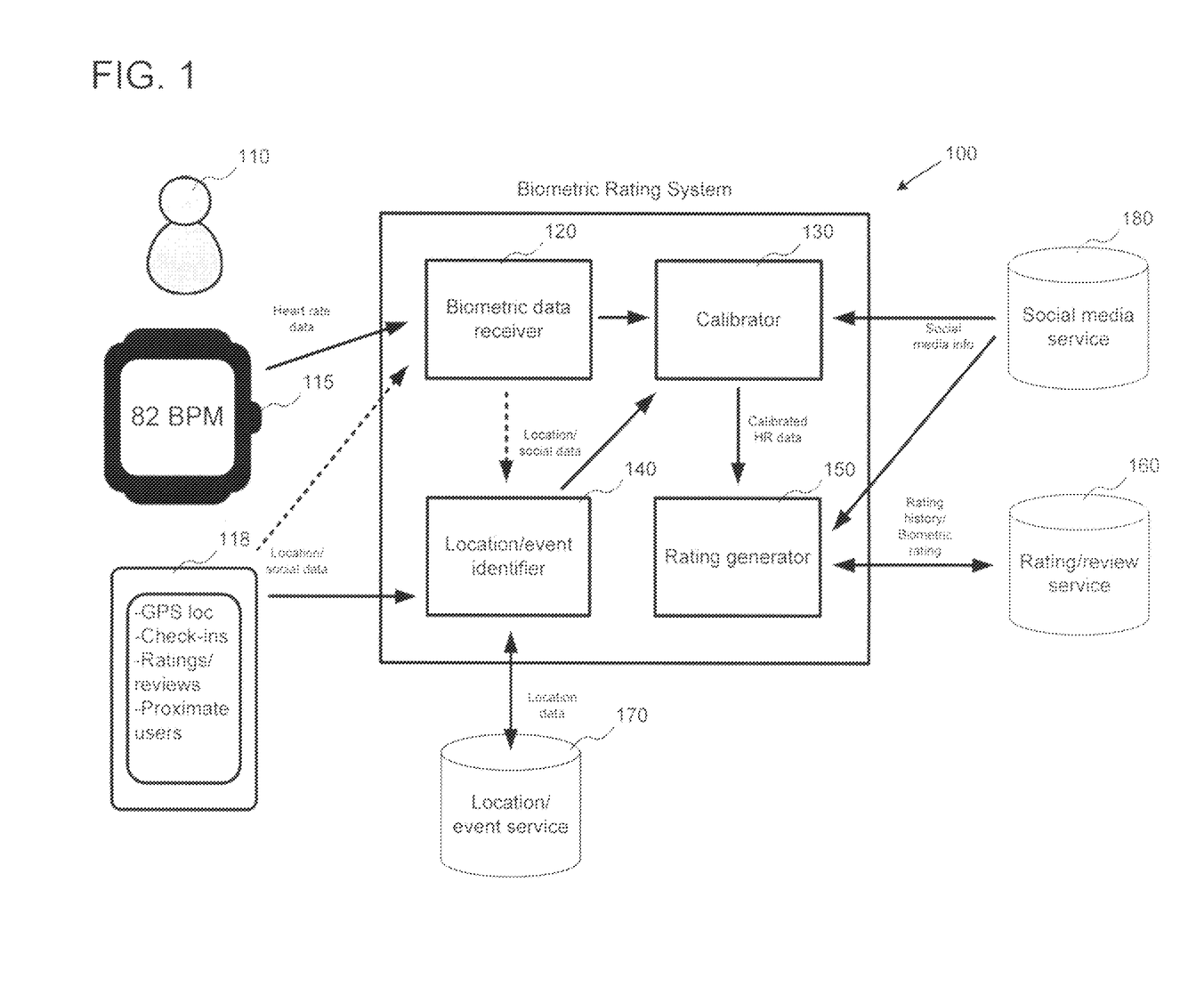
FIG. 1 illustrates example components and information flows of a biometric rating system, in accordance with various embodiments.

Referring now to FIG. 1, components and information flows of a BRS 100 are shown in accordance with various embodiments. It may be noted that, while particular processing, data collection, and service components are illustrated, as well as particular information flows between these components, in various embodiments, the BRS 100 may include other components or flows and/or may omit one or more components or flows illustrated in FIG. 1. In various embodiments, the illustrated components may be implemented in hardware and/or software, and may be configured to operate on computing devices of various form factors, as are described herein.

In various embodiments, the BRS 100 may include a biometric data receiver 120 ("BDR 120") which may be configured to receive biometric data from one or more biometric data collection devices used by a user 110. In various embodiments, the one or more biometric data collection devices may include a smart watch 115 (as illustrated in FIG. 1) or other wearable device. In various embodiments, the biometric data collection devices may include, but are not limited to, smartwatches 115, fitness trackers, heart rate monitor straps, computing-enabled clothing, etc. In various embodiments, the one or more biometric data collection devices may be configured to collect various types of biometric data, including, but not limited to, heart rate, internal temperature, external temperature, skin moisture, skin conductivity, movement data, body orientation data, location data, etc. For the purposes of simpler description, the collection of biometric data will be described as measurement of heart rate by the smart watch 115; however, it may be recognized that, in alternative embodiments, other biometric data collection devices and types of biometric data may be used.

In various embodiments, the user 110 may also utilize a mobile device 118, which may be configured to transmit location and/or social data to the BRS 120. In various embodiments, location data may include positional information, such as from a Global Positioning System ("GPS"), or other positional tool, of the mobile device 118. In various embodiments, the location data may include semantic location data, such as an identity of one or more locations to which the user 110 has checked in using the mobile device 118. In other embodiments, the mobile device 118 may be configured to send social data, such as ratings/reviews performed by the user 110 on the mobile device or identities of one or more other users who are proximate to the user 110 (such as users who have checked in nearby, or who are detected as being physically proximate to the mobile device 118), Such location and/or social data may be transmitted from one or more navigational, mapping, and or social media applications on the mobile device 118. In various embodiments, the mobile device 118 may be configured to transmit the location/social data to a location/event identifier 140 ("LEI 140"), which is described in greater detail below. In other embodiments, the mobile device 118 may send the location or social data to the BDS 120, which may in turn provide information to the LEI 140. In other embodiments, location and/or social data may be received from a suitably equipped smart watch 115 (or other biometric data collection device). In other embodiments, smart watch 115 may be configured to provide the biometric data to mobile device 118 to provide to BDR 120. In some embodiments, the biometric and location data may be provided to BDR 120 and LEI 140 contemporaneously when the data are collected (e.g., while the user is wearing smart watch 115). In some embodiments, the biometric and location data may be provided to BDR 120 and LEI 140 after the data has been collected, with smart watch 115 and/or mobile device 118 having better communication access for transmission (e.g., when WiFi is available, versus via a cellular network).

In various embodiments, the BRS 100 may include the LEI 140, which may be configured to determine a semantic location, if not otherwise determined, to associate with the biometric data received by the BDS 120. In various embodiments, the LEI 140 may utilize a location/event service 170 ("LES 170") external to the BRS 100, which may translate location data, such as GPS data received from the mobile device 118, to a semantic location, such as a venue. In various embodiments, the LES 170 may include event services, such as calendars (ether public or private to the user 110) and/or social media information. In such embodiments, the LEI 140 may also be able to identify one or more events that the received biometric data may be associated with. For example, if heart rate data is collected at a particular GPS location, the LEI 140 may determine that the GPS location is inside a musical venue. The LEI 140 may further determine, such as through referral to LES 170s including calendars and/or social media services, that a musical act is performing at the musical venue at the time the heart rate data was collected. This information may, in turn be utilized by the BRS 100 to generate a review of the musical venue and/or the musical act.

In various embodiments, the BRS 100 may include a calibrator 130 which may be configured to receive biometric data from the BDR 120 and calibrate the biometric data into implicit ratings to use in generating the output biometric-based ratings. In various embodiments, the calibrator 130 may be configured to adjust biometric data based on known or assumed factors that may have influenced the biometric data. In some embodiments, these factors may include social data, such as the presence of users that may cause the user 110 to exhibit higher (or lower) than normal biometric data. Thus, if the user 110 is proximate to a friend, the user 110 may be calmed by the experience, and may exhibit a lower than normal heart rate. In such a circumstance, the calibrator 130 may adjust the received heart rate up to compensate. In other embodiments, the calibrator may adjust the received biometric data based on physical activity (such as exercise being performed at the location, or sleep taken at the location). In other embodiments, the calibrator may adjust biometric data based on the user 110's previous history with a location/venue/event, such as to adjust for a previously experienced baseline. Such history may be obtained, in various embodiments, from a social media service 180 external to the BRS 100.

In yet other embodiments, the calibrator 130 may identify one or more segments in the received biometric data. For example, if the user 110 is identified as being at a restaurant, the calibrator 130 may identify segments of the received biometric data and partition the data into, for example, an arrival portion, an ordering portion, an eating portion, etc. In various embodiments, these portions may be used to provide separate ratings for the different aspects of the experience at the location.

In various embodiments, the calibrator 130 may be configured to generate, after adjustment of the biometric data, one or more implicit ratings for the location. For example, the calibrator may generate a numerical rating for the location, or a positive or negative rating. In other embodiments, an implicit emotion indicator may be generated whether based on biometric data such as heart rate, galvanic skin reaction or other data. For example the indicator may include words such as, but not limited to: frustrated, excited, happy, etc. In various embodiments, indication of emotions may add richness and context to an implicit rating.

These implicit ratings may be used, in turn, by a rating generator 150 ("RG 150") to generate ratings for the location. In various embodiments, the RG 150 may be configured to obtain previous ratings for the location (or for related locations/venues/events), such as from the social media service 180 or from a ratings/review service 160, and to adjust these previous ratings to generate a new biometric-based rating. For example, if the user 110 is at a restaurant and the calibrator 130 has generated an implicit 4/5 rating, the RG 150 may obtain previous reviews of the restaurant and may average this new 4/5 rating with the average of the previous ratings. In other embodiments, the RG 150 may utilize ratings for similar types of restaurants; for example if the user 100 has previously rated similar restaurants as an average of 3/5, the RG 150 may generate a very positive rating for this restaurant, as its implicit 4/5 rating is higher than the user's historical average. In yet other embodiments, the rating generator 150 may generate a rating from scratch, such as if the user has little or no relevant history. The RG 150 may, in various events, provide a rating to the rating/review service 160 for publication to other users. In various embodiments, prior to publication, the RG 150 may notify the user 110 and may allow the user to approve, deny, and/or modify the generated rating. In various embodiments, the rating generated by the RG 150 may include numerical values which may be in various units, such as stars, thumbs, hearts, etc. In other embodiments, no unit may be used. In other embodiments, the RG 150 may generate ratings including words provided by the calibrator 130 or may modify words from previous reviews, such as based on the implicit rating provided by the calibrator 130. In other embodiments, the RG 150 may facilitate entry of one or more words by the user 110 or another user to be associated with the generated rating.

Figure 2:
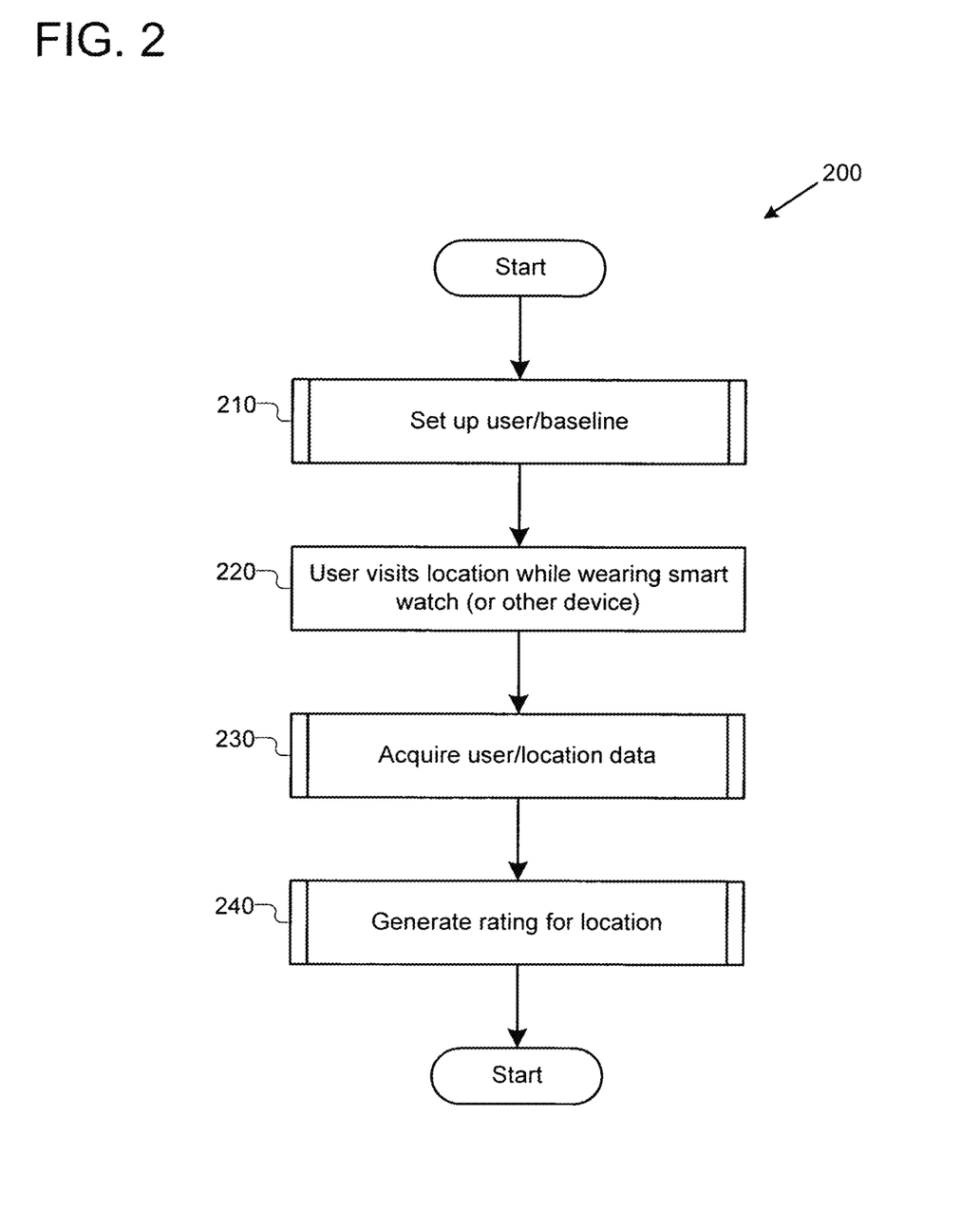
FIG. 2 illustrates an example process for generating ratings based on biometric data, in accordance with various embodiments.

Referring now to FIG. 2, an example process 200 for the BRS 100 generating ratings based on biometric data is illustrated in accordance with various embodiments. While FIG. 2 illustrates particular operations in a particular order, in various embodiments the operations may be combined, split into parts, and/or omitted. The process may begin at operation 210, where the BRS 100 may be set up for a particular user 110 along with that user 110's baseline behavior. Particular embodiments of the process of operation 210 may be described below with reference to process 300 of FIG. 3. Next at operation 220, the user 110 may visit a location while wearing a biometric data collection device, such as smart watch 115. In various events, this may include visiting a venue and/or attending an event. Next, at operation 230, the BRS 100, and in particular the BDR 120, may acquire user information, including biometric information, as well as location and social information. Particular embodiments of the process of operation 230 may be described below with reference to process 400 of FIG. 4.

Next, at operation 240, the BRS 100 may generate a biometric data-based rating for the location (such as for the venue and/or the event). Particular embodiments of the process of operation 240 may be described below with reference to process 500 of FIG. 5. The process may then end.

Figure 3:
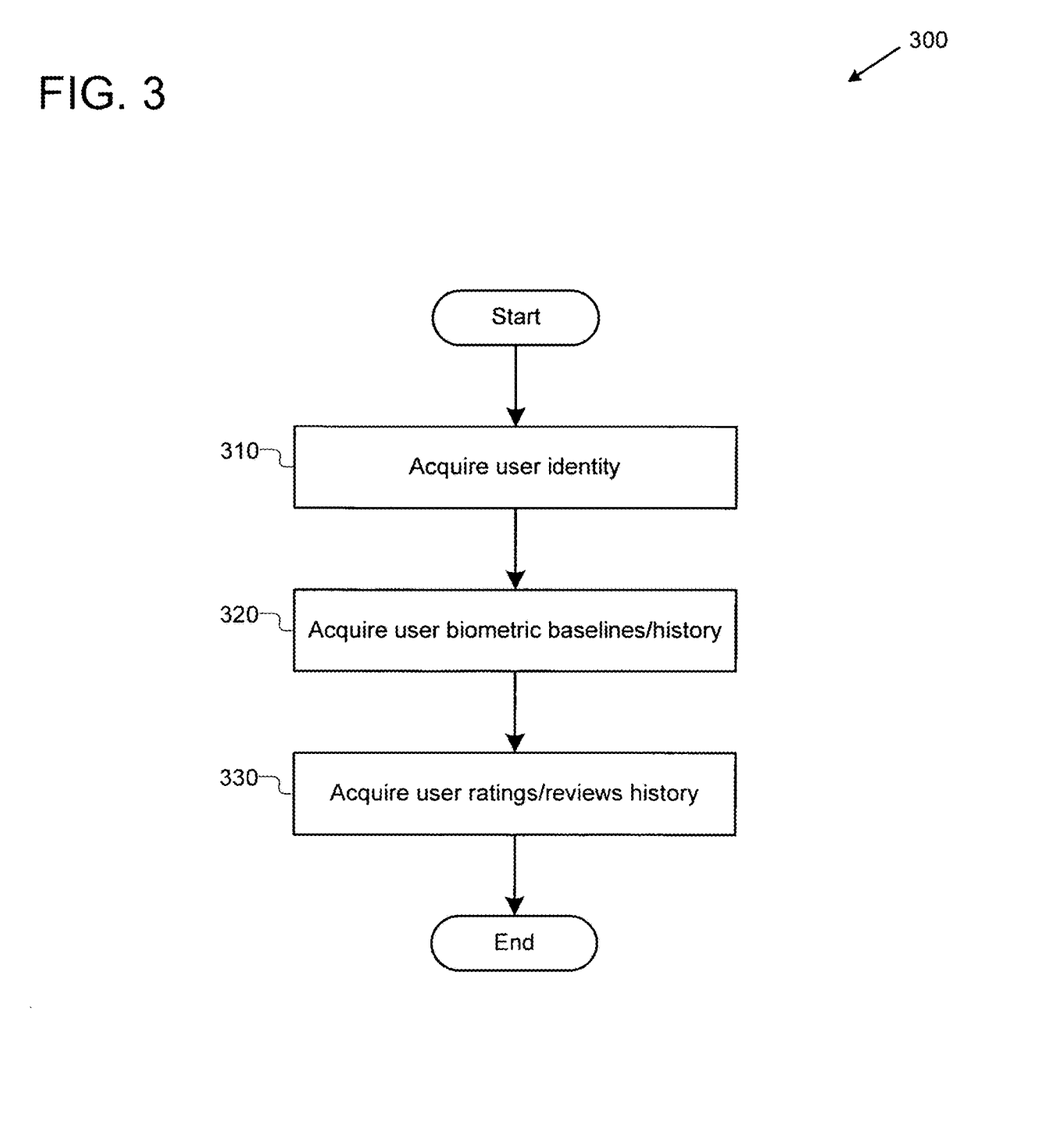
FIG. 3 illustrates an example process for setting up user and baseline information, in accordance with various embodiments.

Referring now to FIG. 3, an example process 300 for setting up user and baseline information is illustrated in accordance with various embodiments. In various embodiments, process 300 may be performed to implement, in whole or in part, operation 210 of process 200 of FIG. 2. While FIG. 3 illustrates particular operations in a particular order, in various embodiments the operations may be combined, split into parts, and/or omitted. The process may begin at operation 310, where the BDS 120 may acquire a user identity. In various embodiments, the smartwatch 115, mobile device 118, or other device may identify the user 110 and may provide that identity to the BDS 120 to be associated with the later provisioning of biometric, location, and/or social data from one or both devices. In various embodiments, the user 110 may be identified uniquely, such as by name, login and password, or other unique identifying information. In other embodiments, the user 110 may be identified anonymously or semi-anonymously, such as via a handle that does not provide personal information about the user 110. In such embodiments, by protecting the user 110's identity, the BRS 100 may provide for generation of biometric data based ratings, which may benefit other users, venues, or events, while not requiring the user 110, on whom the rating may be based, to be identified through their generated ratings.

Next, at operation 320, the BRS 100 may acquire user biometric baselines previously generated by (or on behalf of) the user 110. In various embodiments, the BRS 100 may include a user history storage for maintenance of such historical user baseline. In other embodiments, the BDS 120 may acquire biometric data over a period of time in order to determine a baseline for the biometric data. For example, the BDS 120 may acquire heart rate data from the smart watch 115 over a period of time to determine a baseline heart rate for the user 110. Next, at operation 330, the BRS 100 may acquire ratings/reviews history, such as from the social media service 180 or the ratings/review service 160. As discussed herein, these historical ratings and reviews may be used for calibration as well as for generation of biometric data based review. After operation 330, the process may end.

Figure 4:
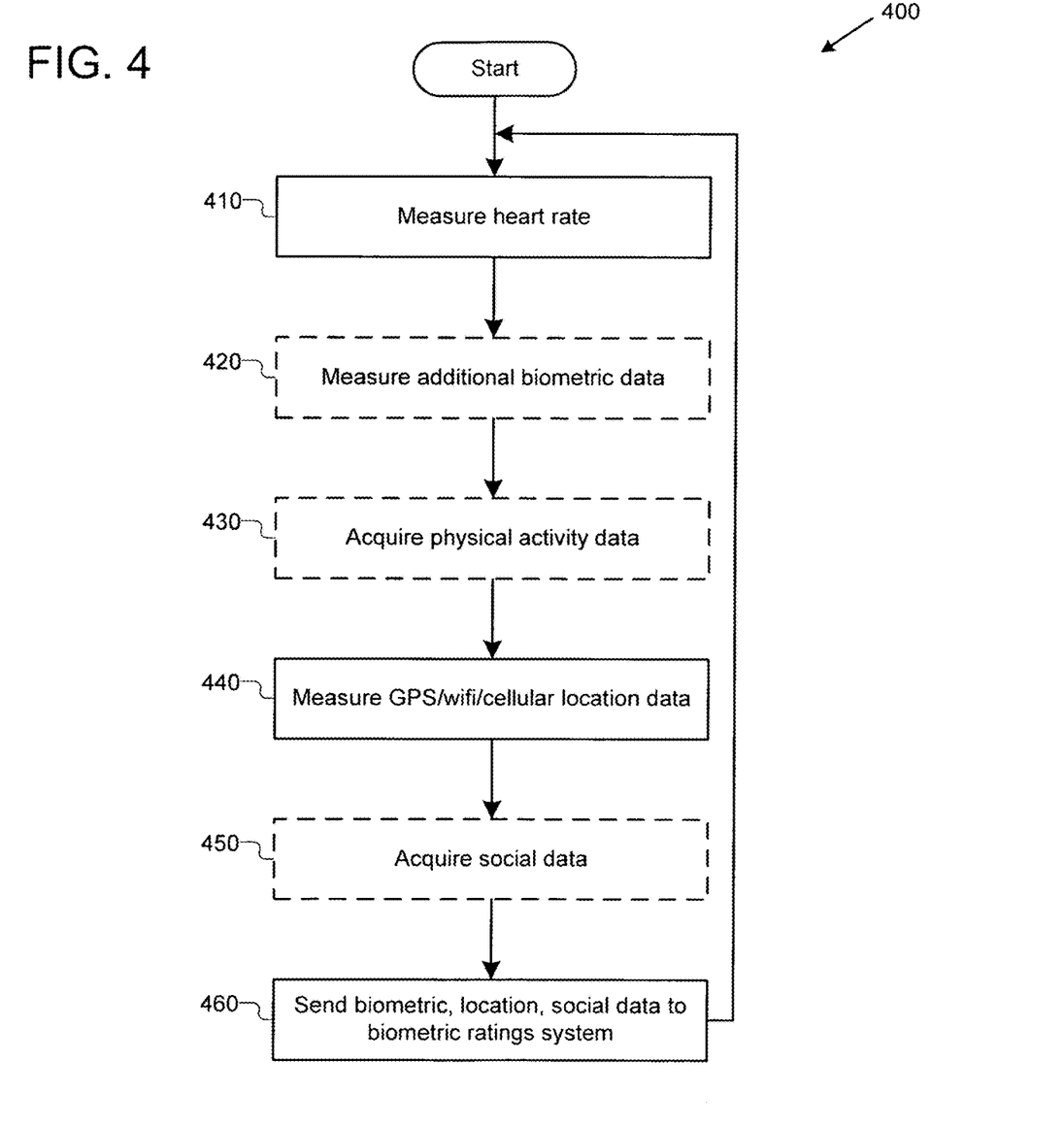
FIG. 4 illustrates an example process for acquiring user and location data, in accordance with various embodiments.

Referring now to FIG. 4, an example process 400 for acquiring user and location data is illustrated in accordance with various embodiments. In various embodiments, process 400 may be performed to implement, in whole or in part, operation 230 of process 300 of FIG. 3. While FIG. 4 illustrates particular operations in a particular order, in various embodiments the operations may be combined, split into parts, and/or omitted. The process may begin at operation 410, where the smart watch 115 (or other biometric data collection device) may measure a current heart rate for the user 110. Next, at optional operation 420, the smart watch 115 may measure additional biometric data, for example, but not limited to, steps, movement data, positional data, temperature, skin conductivity, etc. Next, at optional operation 430, the smart watch 115 (and/or mobile device 118) may acquire physical activity information for the user. For example, if the user 110 has indicated to the smart watch 115 or mobile device 118 that they are exercising, this indication may be identified for sharing with the BRS 100. In another embodiment, the smart watch 110 or mobile device 115 may itself identify that the user 110 is participating in a physical activity; for example, the mobile device 118 or smart watch 115 may include a pedometer that indicates that the user 110 is currently walking quickly or other movement technology that may indicate that the user 110 is currently lying down.

Next, at operation 440, the smart watch 115 and/or mobile device 118 may measure location data, such GPS data, or cellular-or WiFi-assisted location data. At operation 440 the smart watch 115 and/or mobile device 118 may optionally resolve this location data to a particular semantic location, such as a venue or event. Next, at optional operation 450, the mobile device may acquire social data for the user 110. In various embodiments, such social data may include identification of one or more venues or events to which the user 110 has checked in and/or the identity of nearby users. Finally, at operation 460, the smart watch 115 and/or mobile device 118 may send the measured or acquired biometric, location, and/or social data to the BDR 120 and or the LEI 140 of the BRS 100. The process may then repeat for further measurement or acquisition of user or location data.

Figure 5:
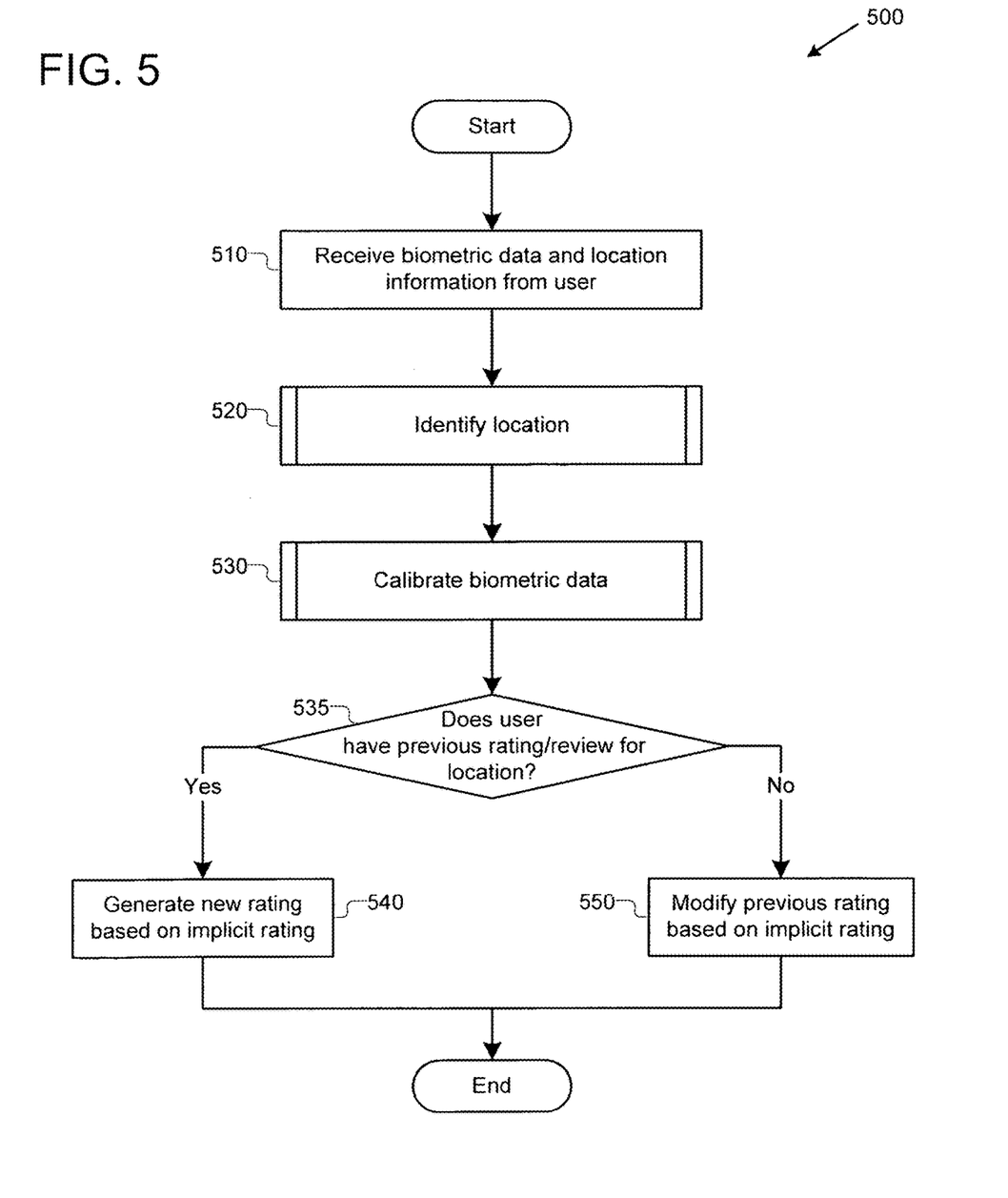
FIG. 5 illustrates an example process for generating a biometric-data-based rating, in accordance with various embodiments.

Referring now to FIG. 5, an example process 500 for generating a biometric-data-based rating is illustrated in accordance with various embodiments. In various embodiments, process 500 may be performed to implement, in whole or in part, operation 240 of process 200 of FIG. 2. While FIG. 5 illustrates particular operations in a particular order, in various embodiments the operations may be combined, split into parts, and/or omitted.

The process may begin at operation 510, where the BDR 120 or LEI 140 may receive the biometric, location, or social data from the smart watch 115 and/or the mobile device 118. Next, at operation 520, the LEI 140 may identify a location to associate with the received biometric data. Particular embodiments of the process of operation 520 may be described below with reference to process 600 of FIG. 6.

Figure 6:
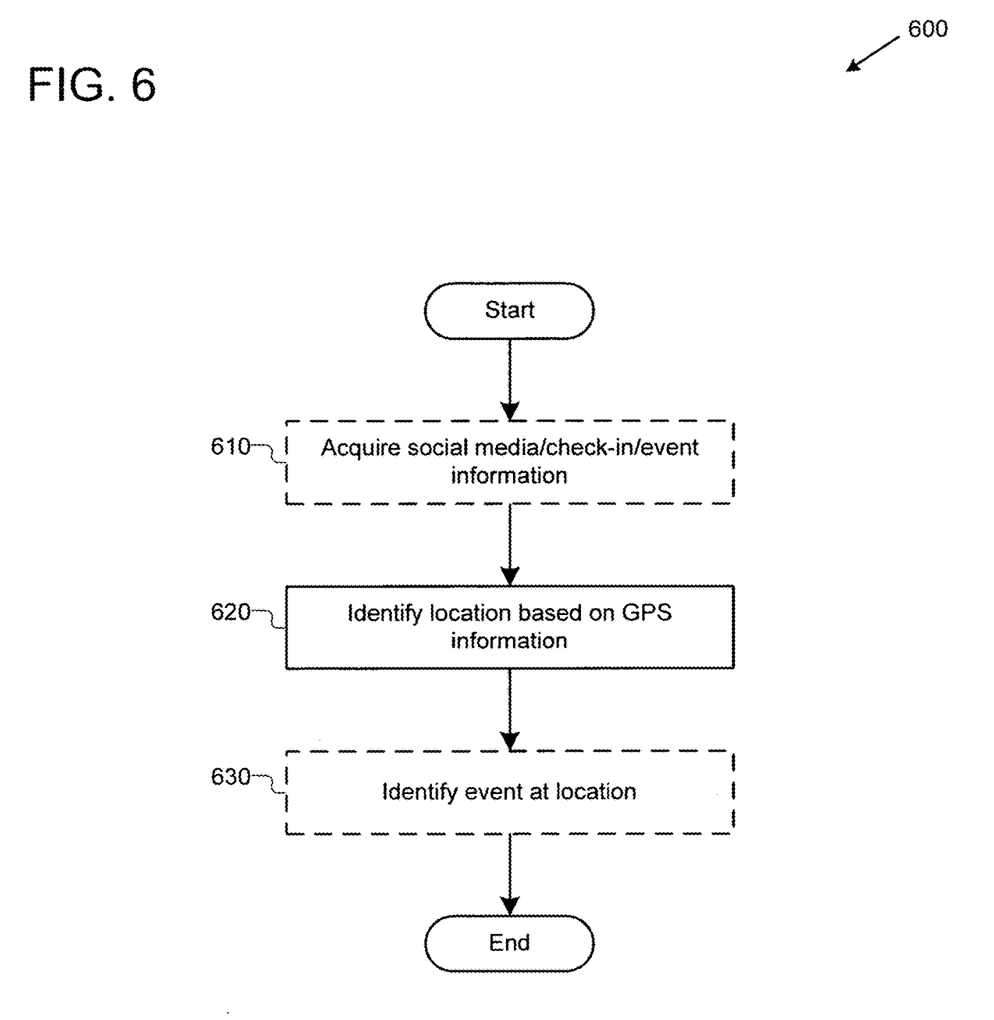
FIG. 6 illustrates an example process for identifying a location, in accordance with various embodiments.

Referring now to FIG. 6, an example process 600 for identifying a location is illustrated in accordance with various embodiments. In various embodiments, process 600 may be performed to implement, in whole or in part, operation 520 of process 500 of FIG. 5. While FIG. 6 illustrates particular operations in a particular order, in various embodiments the operations may be combined, split into parts, and/or omitted. The process may begin at optional operation 610, where the LEI 140 may acquire social media/check-in/event information, such as from the LES 170 or the social media service 180. For example, the LEI 140 may acquire a history of posts, or check-ins for the user 110, events that are to be attended by the user, and/or event or calendar information that is not private to the user 110. Next, at operation 620, the LEI 140 may in consultation with the LES 170, identify a location for the user 110 based on the GPS location acquired. In some embodiments, this identification may be aided by social media data which may have been previously obtained. Such, a location may include various types of locations, such as a venue, such as a restaurant, theater, or sporting location, a public location, such as a square or park, or a private location, such as a residence. Next, at optional operation 630, the LEI 140 may identify an event occurring at the location, such as by using the calendars previously acquired at operation 610. In various embodiments, the event identified may be an event that is known to be taking place at or near the location identified at operation 620. The process may then end.

Referring back to FIG. 5, at operation 530, the calibrator 130 may calibrate the received biometric data. Particular embodiments of the process of operation 530 may be described below with reference to process 700 of FIG. 7.

Figure 7:
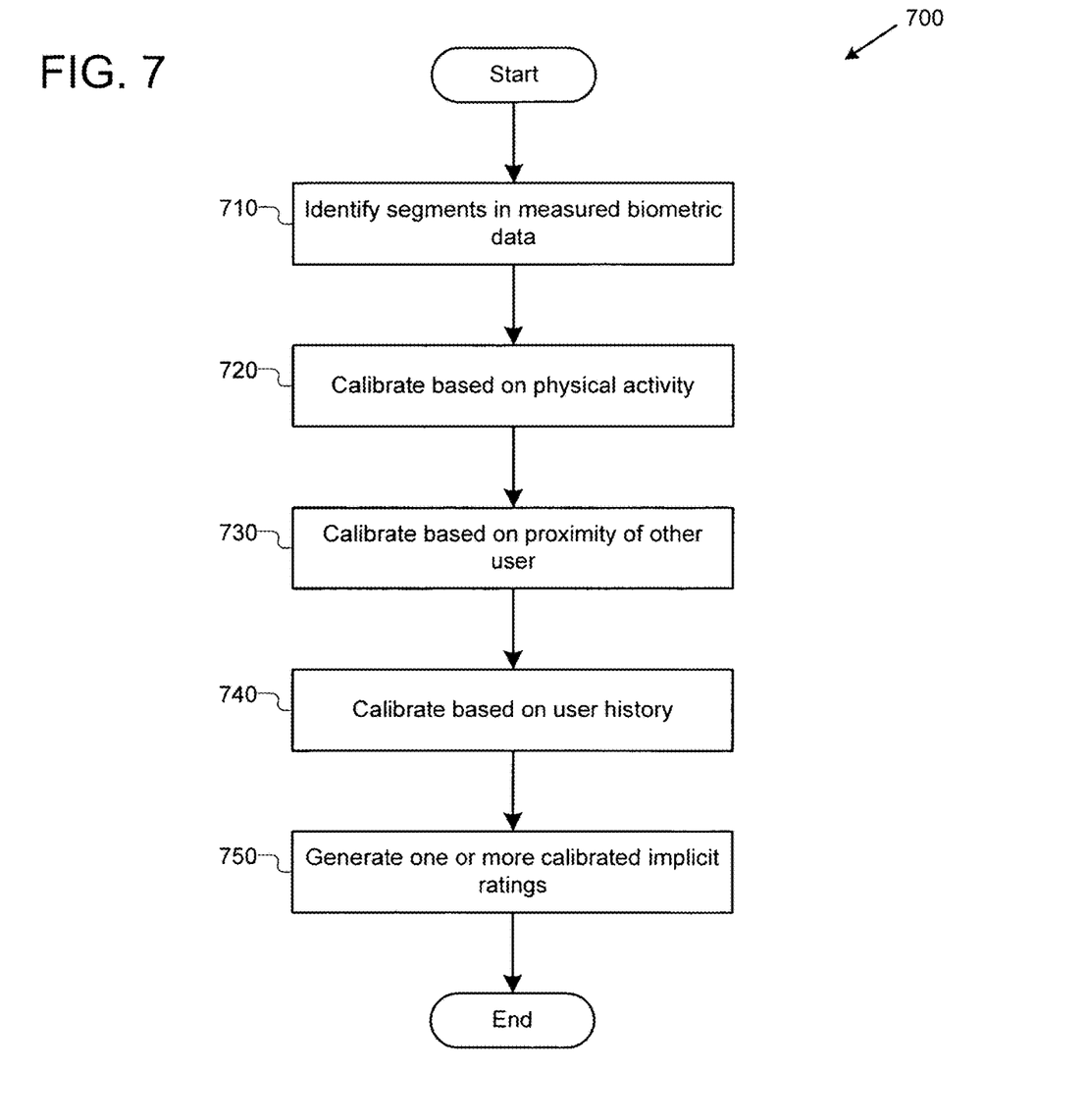
FIG. 7 illustrates an example process for calibrating biometric data, in accordance with various embodiments.

Referring now to FIG. 7, an example process 700 for calibrating biometric data is illustrated in accordance with various embodiments. In various embodiments, process 600 may be performed to implement, in whole or in part, operation 530 of process 500 of FIG. 5. While FIG. 7 illustrates particular operations in a particular order, in various embodiments the operations may be combined, split into parts, and/or omitted. The process may begin at optional operation 710, where the calibrator 130 may identify one or more segments in the measured biometric data. In various embodiments, the calibrator 130 may identify changes in the biometric data which are above or below one or more thresholds. In other embodiments, the calibrator 130 may identify segments based on changes in location of the user 110. In yet other embodiments, the calibrator 130 may identify segments based on known event times. In yet other embodiments, the calibrator 130 may utilize an assumption of one or more segments that are presumed to be experienced by the user 110 based on the event or location type. For example, as discussed above, if the user 110 is assumed to be eating a meal at an identified restaurant location, the calibrator 130 may segment the biometric data according to portions of the meal experience.

Next, at operation 720, the calibrator 130 may calibrate the biometric data based on physical activity. As discussed above, the calibrator 130 may adjust the biometric data up or down to account for exercise, sleep or other activity that may be occurring. Next, at operation 730, the calibrator 130 may calibrate the biometric data based on proximity of other users. For example, the calibrator 130 may account for the presence of another user who is known (or assumed) to have a calming effect on the user 110. Next, at operation 740, the calibrator may calibrate the biometric data based on the user 110's history, such as with the location/venue/event. In various embodiments, this operation 740 may include calibration based on history with the exact same location or event, and/or with locations or events of a similar type. In various embodiments, this operation 740 may also include calibration based on the user's long or short term history. For example, the calibrator 130 may calibrate the biometric data based on a user's baseline, such as based on their previous long-term history of biometric data. In another embodiment, the calibrator 130 may calibrate the biometric data based on a short-term user history, such as a user's biometric data received that day. Thus, if a user is in a particularly good or bad mood, the calibrator 130 may calibrate the biometric data accordingly.

Next, at operation 750, the calibrator 130 may generate an implicit rating for the location based on the calibrated biometric data. In various embodiments, the implicit rating may be based on a comparison of the calibrated biometric data to baseline biometric data for the user 110. In some embodiments, the difference between the baseline and the calibrated data may be translated into a positive or negative score (depending on the positive or negative value of the difference). This may be later used to generate a biometric data based rating. It may be noted that, in various embodiments, the calibrator 130 may generate multiple implicit ratings, such as for each of the segments previously identified at operation 710. The process may then end.

Referring back to FIG. 5, at decision operation 535, the RG 150 may determine if the user 110 has a previous rating or review for the identified location. If so, then at operation 550, the RG 150 may modify the previous rating based on the implicit rating. For example, a previous rating may be averaged with the newly generated implicit rating, or may be otherwise adjusted up or down to be closer to the implicit rating. If, at decision operation 535, the RG 150 did not determine that a previous rating or review existed, then at operation 540, the RG 150 may generate a new rating. In various embodiments, the RG 150 may use the implicit rating directly to generate a new rating. In other embodiments, the RG 150 may compare the implicit rating to other ratings by other users in order to generate the new rating. It may be noted that, in various embodiments, the RG 150 may generate multiple ratings, such as when the calibrator 130 generates multiple implicit ratings for each of the segments previously identified at operation 710. In either event, the process may then end.

Figure 8:
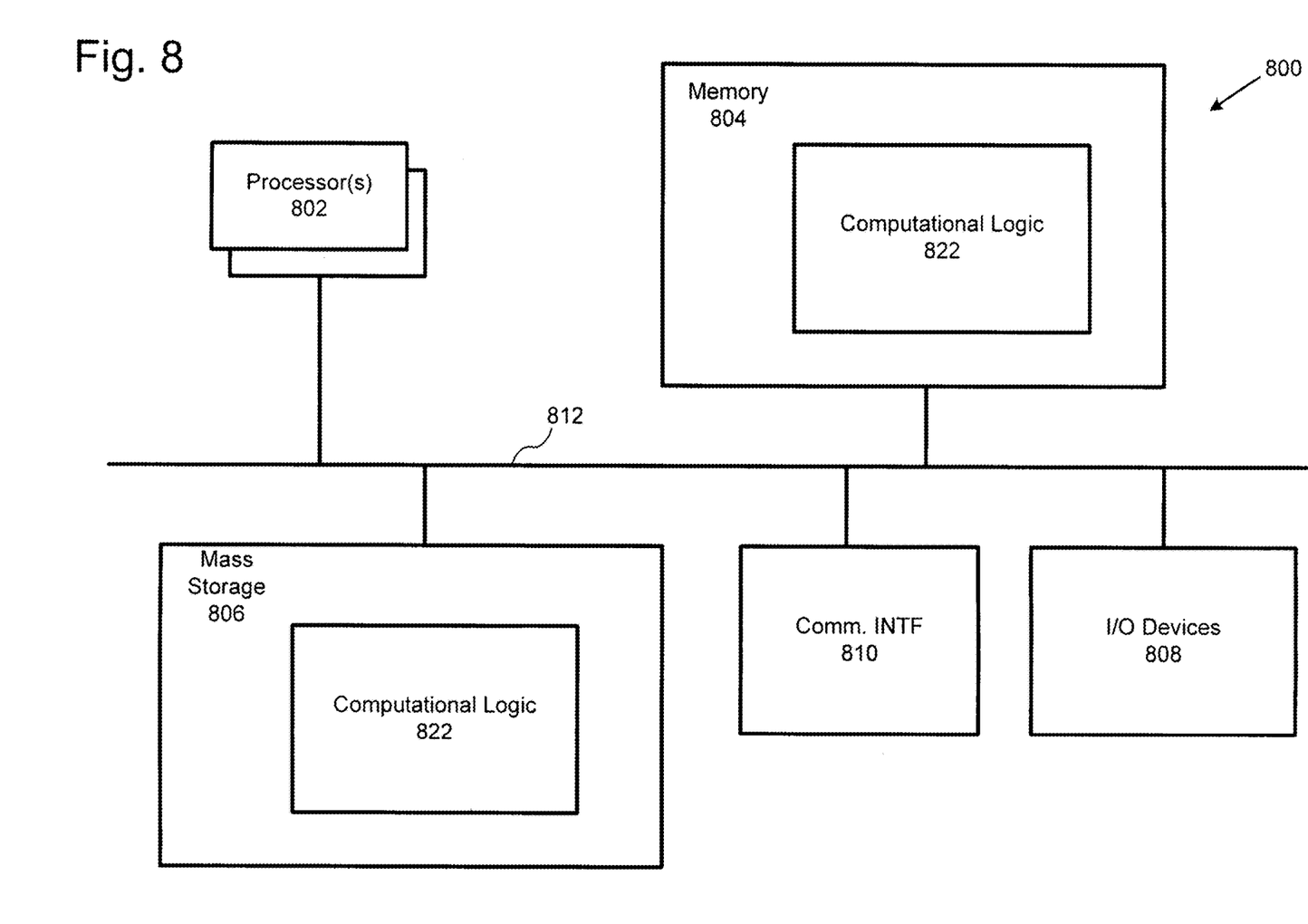
FIG. 8 illustrates an example computing environment suitable for practicing various aspects of the present disclosure, in accordance with various embodiments.

Referring now to FIG. 8, an example computer suitable for practicing various aspects of the present disclosure, including processes of FIGS. 2-7, is illustrated in accordance with various embodiments. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control, remote control, gaming controller, image capture device, and s₉ forth) and communication interfaces 810 (such as network interface cards, modems, infrared receivers, radio receivers (e.g., Bluetooth, Wi-Fi, Near Field Communications, Radio-frequency identification, and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing one or more of the operations associated with biometric rating generation techniques described with reference to FIGS. 2-7, collectively referred to as computing logic 822. The various elements may be implemented by assembler instructions supported by processor(s) 802 or high-level languages, such as, for example, C, that can be compiled into such instructions. In various embodiments, the system memory 804 or mass storage 806 may include various memory implementations, including integrated flash memory, such as in a System on a Chip, a USB flash drive, SD Card, on SATA SSD, etc.

The permanent copy of the programming instructions may be placed into permanent storage devices 806 in the factory, or in the field, through, for example, a distribution medium (not shown), such as a compact disc (CD), or through communication interface 810 (from a distribution server (not shown)). In embodiments, the programming instructions may be stored in one or more computer readable non-transitory storage media. In other embodiments, the programming instructions may be encoded in transitory storage media, such as signals.

The number, capability and/or capacity of these elements 810-812 may vary, depending on whether computer system is used as smart watch 115 and/or mobile device 118, or host BRS 100 (BDR 120, calibrator 130, LEI 140 and/or rating generator 150). Their constitutions are otherwise known, and accordingly will not be further described.

Figure 9:
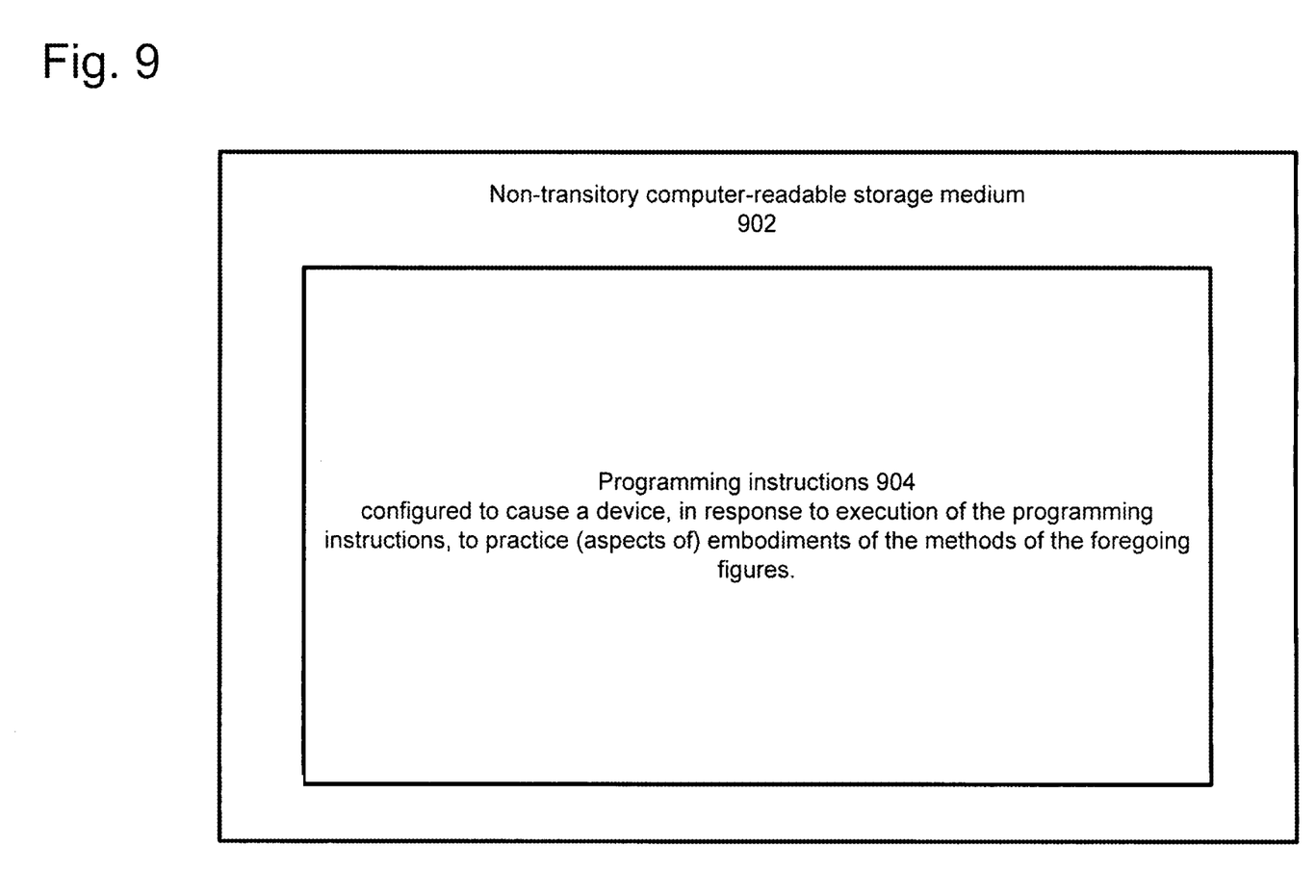
FIG. 9 illustrates an example storage medium with instructions configured to enable an apparatus to practice various aspects of the present disclosure, in accordance with various embodiments.

FIG. 9 illustrates an example least one computer-readable storage medium 902 having instructions configured to practice all or selected ones of the operations associated with the techniques earlier described, in accordance with various embodiments. As illustrated, least one computer-readable storage medium 902 may include a number of programming instructions 904. Programming instructions 904 may be configured to enable a device, e.g., computer 800, in response to execution of the programming instructions, to perform, e.g., various operations of processes of the figures described above, e.g., but not limited to, to the various operations performed to perform selective reporting techniques described herein In alternate embodiments, programming instructions 904 may be disposed on multiple least one computer-readable storage media 902 instead.

Referring back to FIG. 8, for one embodiment, at least one of processors 802 may be packaged together with a memory having computational logic 822 configured to practice aspects of processes of FIGS. 2-7. For one embodiment, at least one of processors 802 may be packaged together with a memory having computational logic 822 configured to practice aspects of processes of FIGS. 2-7 to form a System in Package (SiP). For one embodiment, at least one of processors 802 may be integrated on the same die with a memory having computational logic 822 configured to practice aspects of processes of FIGS. 2-7. For one embodiment, at least one of processors 802 may be packaged together with a memory having computational logic 822 configured to practice aspects of processes of FIGS. 2-7 to form a System on Chip (SoC). For at least one embodiment, the SoC may be utilized in, e.g., but not limited to, a computing tablet. (e.g., Wi-Fi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an apparatus for generation of biometric-based ratings, and may include one or more computing processors. The apparatus may include a biometric data receiver to receive biometric data transmitted from a wearable device of a user. The apparatus may also include a biometric rating generator coupled to the biometric data receiver, the biometric rating generator to operate on the one or more computer processors to generate a rating associated with a location visited by the user contemporaneously with measurement of the biometric data, the rating being based at least in part on the received biometric data and the location.

Example 2 may include the apparatus of example 1, and may further include a location identifier coupled to the biometric data receiver and to operate on the one or more computing processors to identify the location visited by the user.

Example 3 may include the apparatus of example 2, wherein the location identifier may be to identify an event or a venue at the location based on global positioning system (GPS) data received from the wearable device or other device utilized by the user.

Example 4 may include the apparatus of example 2, wherein the location identifier may be to identify an event or a venue at the location based on a calendar event or social media information associated with the user.

Example 5 may include the apparatus of any of examples 1-4, and may further include a calibrator to operate on the one or more computing processors to calibrate the biometric data prior to generation of the rating.

Example 6 may include the apparatus of example 5, wherein the calibrator may be to calibrate the biometric data based on identification of a baseline of biometric data for the user.

Example 7 may include the apparatus of example 5, wherein the calibrator may be to calibrate the biometric data based on identification of one or more segments in the biometric data.

Example 8 may include the apparatus of example 7, wherein the biometric rating generator may be to generate separate ratings for separate segments identified by the calibrator.

Example 9 may include the apparatus of example 5, wherein the calibrator may be to calibrate the biometric data through: determination of one or more persons that may be proximate to the user, determination of an effect of the proximity of the one or more persons on the user, and calibration of the biometric data to account for the effect of the proximity of the one or more persons on the user.

Example 10 may include the apparatus of example 9, wherein the biometric data receiver may be to receive proximity information from the wearable device or another device utilized by the user.

Example 11 may include the apparatus of example 10, wherein the calibrator may be to receive proximity information from one or more social media services.

Example 12 may include the apparatus of example 5, wherein the calibrator may be to calibrate the biometric data through determination of an effect of the location on the user and calibration of the biometric data to account for the effect of the proximity of the location on the user.

Example 13 may include the apparatus of any of examples 1-12, wherein biometric rating generator may be to determine that an event may be occurring at the location.

Example 14 may include the apparatus of example 13, wherein the biometric rating generator may be to generate the rating for the event at the location.

Example 15 may include the apparatus of any of examples 1-14, wherein the biometric rating generator may be to generate the rating through modification of a previous rating for the location by the user based on the biometric data.

Example 16 may include the apparatus of any of examples 1-15, wherein the biometric data includes heart rate data for the user.

Example 17 may include the apparatus of any of examples 1-16, wherein the rating may be a numerical rating.

Example 18 may include the apparatus of any of examples 1-16, wherein the rating may be a qualitative positive or negative rating.

Example 19 may include a computer-implemented method for generation of biometric-based ratings. The method may include receiving, by a computing system, biometric data transmitted from a wearable device of a user. The method may also include generating, by the computing system, a rating associated with a location visited by the user contemporaneously with measurement of the biometric data, wherein generating includes generating the rating based at least in part on the received biometric data and the location.

Example 20 may include the computer-implemented method of example 19, and may further include identifying, by the computing system, the location visited by the user.

Example 21 may include the computer-implemented method of example 20, wherein identifying the location may include identifying an event or a venue at the location based on global positioning system (GPS) data received from the wearable device or other device utilized by the user.

Example 22 may include the computer-implemented method of example 20, wherein identifying the location may include identifying an event or a venue at the location based on a calendar event or social media information associated with the user.

Example 23 may include the computer-implemented method of any of examples 19-22, and may further include calibrating, by the computing system, the biometric data prior to generation of the rating.

Example 24 may include the computer-implemented method of example 23, wherein calibrating the biometric data may include calibrating the biometric data based on identification of a baseline of biometric data for the user.

Example 25 may include the computer-implemented method of example 23, wherein calibrating the biometric data may include calibrating the biometric data based on identification of one or more segments in the biometric data.

Example 26 may include the computer-implemented method of example 25, wherein generating the rating may include generating separate ratings for separate segments.

Example 27 may include the computer-implemented method of example 23, wherein calibrating the biometric data may include: determining one or more persons that may be proximate to the user, determining an effect of the proximity of the one or more persons on the user, and calibrating the biometric data to account for the effect of the proximity of the one or more persons on the user.

Example 28 may include the computer-implemented method of example 27, and may further include receiving, by the computing system, proximity information from the wearable device or another device utilized by the user.

Example 29 may include the computer-implemented method of example 28 wherein receiving proximity information may include receiving proximity information from one or more social media services.

Example 30 may include the computer-implemented method of example 23, wherein calibrating the biometric data may include determining an effect of the location on the user and calibrating the biometric data to account for the effect of the proximity of the location on the user.

Example 31 may include the computer-implemented method of any of examples 19-30, wherein generating the rating may include determining that an event may be occurring at the location.

Example 32 may include the computer-implemented method of example 31, wherein generating the rating may include generating the rating for the event at the location.

Example 33 may include the computer-implemented method of any of examples 19-32, wherein generating the rating may include generating the rating through modification of a previous rating for the location by the user based on the biometric data.

Example 34 may include the computer-implemented method of any of examples 19-33, wherein receiving biometric data may include receiving heart rate data for the user.

Example 35 may include the computer-implemented method of any of examples 19-34, wherein generating the rating may include generating a numerical rating.

Example 36 may include the computer-implemented method of any of examples 19-34, wherein generating the rating may include generating a qualitative positive or negative rating.

Example 37 may include one or more computer-readable media containing instructions written thereon that, in response to execution by a computing system, cause the computing system to receive biometric data transmitted from a wearable device of a user. The instructions may also cause the computing system to generate a rating associated with a location visited by the user contemporaneously with measurement of the biometric data, wherein generating may include generating the rating based at least in part on the received biometric data and the location.

Example 38 may include the computer-readable media of example 37, wherein the instructions may be further to identify the location visited by the user.

Example 39 may include the computer-readable media of example 38, wherein identify the location may include identify an event or a venue at the location based on global positioning system (GPS) data received from the wearable device or other device utilized by the user.

Example 40 may include the computer-readable media of example 38, wherein identify the location may include identify an event or a venue at the location based on a calendar event or social media information associated with the user.

Example 41 may include the computer-readable media of any of examples 37-40, wherein the instructions may be further to calibrate the biometric data prior to generation of the rating.

Example 42 may include the computer-readable media of example 41, wherein calibrate the biometric data may include calibrate the biometric data based on identification of a baseline of biometric data for the user.

Example 43 may include the computer-readable media of example 41, wherein calibrate the biometric data may include calibrate the biometric data based on identification of one or more segments in the biometric data.

Example 44 may include the computer-readable media of example 43, wherein generate the rating may include generate separate ratings for separate segments.

Example 45 may include the computer-readable media of example 41, wherein calibrate the biometric data may include: determine one or more persons that may be proximate to the user, determine an effect of the proximity of the one or more persons on the user, and calibrate the biometric data to account for the effect of the proximity of the one or more persons on the user.

Example 46 may include the computer-readable media of example 45, wherein the instructions may be further to receive proximity information from the wearable device or another device utilized by the user.

Example 47 may include the computer-readable media of example 46 wherein receive proximity information may include receive proximity information from one or more social media services.

Example 48 may include the computer-readable media of example 41, wherein calibrate the biometric data may include determine an effect of the location on the user and calibrate the biometric data to account for the effect of the proximity of the location on the user.

Example 49 may include the computer-readable media of any of examples 37-48, wherein generate the rating may include determine that an event may be occurring at the location.

Example 50 may include the computer-readable media of example 49, wherein generate the rating may include generate the rating for the event at the location.

Example 51 may include the computer-readable media of any of examples 37-50, wherein generate the rating may include generate the rating through modification of a previous rating for the location by the user based on the biometric data.

Example 52 may include the computer-readable media of any of examples 37-51, wherein receive biometric data may include receive heart rate data for the user.

Example 53 may include the computer-readable media of any of examples 37-52, wherein generate the rating may include generate a numerical rating.

Example 54 may include the computer-readable media of any of examples 37-52, wherein generate the rating may include generate a qualitative positive or negative rating.

Example 55 may include an apparatus for generation of biometric-based ratings. The apparatus may include means for receiving biometric data transmitted from a wearable device of a user and means for generating a rating associated with a location visited by the user contemporaneously with measurement of the biometric data, wherein generating may include generating the rating based at least in part on the received biometric data and the location.

Example 56 may include the apparatus of example 55, and may further include means for identifying the location visited by the user.

Example 57 may include the apparatus of example 56, wherein means for identifying the location include means for identifying an event or a venue at the location based on global positioning system (GPS) data received from the wearable device or other device utilized by the user.

Example 58 may include the apparatus of example 56, wherein means for identifying the location may include means for identifying an event or a venue at the location based on a calendar event or social media information associated with the user.

Example 59 may include the apparatus of any of examples 55-58, and may further include means for calibrating the biometric data prior to generation of the rating.

Example 60 may include the apparatus of example 59, wherein means for calibrating the biometric data may include means for calibrating the biometric data based on identification of a baseline of biometric data for the user.

Example 61 may include the apparatus of example 59, wherein means for calibrating the biometric data may include means for calibrating the biometric data based on identification of one or more segments in the biometric data.

Example 62 may include the apparatus of example 61, wherein means for generating the rating may include means for generating separate ratings for separate segments.

Example 63 may include the apparatus of example 59, wherein means for calibrating the biometric data may include: means for determining one or more persons that may be proximate to the user, means for determining an effect of the proximity of the one or more persons on the user, and means for calibrating the biometric data to account for the effect of the proximity of the one or more persons on the user.

Example 64 may include the apparatus of example 63, and may further include means for receiving proximity information from the wearable device or another device utilized by the user.

Example 65 may include the apparatus of example 64 wherein means for receiving proximity information may include means for receiving proximity information from one or more social media services.

Example 66 may include the apparatus of example 59, wherein means for calibrating the biometric data may include means for determining an effect of the location on the user and means for calibrating the biometric data to account for the effect of the proximity of the location on the user.

Example 67 may include the apparatus of any of examples 55-66, wherein means for generating the rating may include means for determining that an event may be occurring at the location.

Example 68 may include the apparatus of example 67, wherein means for generating the rating may include means for generating the rating for the event at the location.

Example 69 may include the apparatus of any of examples 55-68, wherein means for generating the rating may include means for generating the rating through modification of a previous rating for the location by the user based on the biometric data.

Example 70 may include the apparatus of any of examples 55-69, wherein means for receiving biometric data may include means for receiving heart rate data for the user.

Example 71 may include the apparatus of any of examples 55-70, wherein means for generating the rating may include means for generating a numerical rating.

Example 72 may include the apparatus of any of examples 55-70, wherein means for generating the rating may include means for generating a qualitative positive or negative rating.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
   one or more computing processors;
   a biometric data receiver to receive biometric data transmitted from a wearable device of a user;
   a calibrator to adjust the received biometric data upwards or downwards based on social data of the user's location at a time of measurement of the biometric data; and
   a biometric rating generator coupled to the calibrator, the biometric rating generator to operate on the one or more computering processors to:
   generate a rating associated with the location visited by the user contemporaneously with measurement of the biometric data, the rating being based at least in part on the received biometric data, as adjusted, and the location,
   wherein the rating is available to one or more other users.

2. The apparatus of claim 1, further comprising a location identifier coupled to the biometric data receiver and to operate on the one or more computing processors to identify the location visited by the user.

3. The apparatus of claim 2, wherein the location identifier is to identify an event or a venue at the location based on global positioning system (GPS) data received from the wearable device or another device utilized by the user.

4. The apparatus of claim 2, wherein the location identifier is to identify an event or a venue at the location based on a calendar event or social media information associated with the user.

5. The apparatus of claim 1, wherein the calibrator is further to calibrate the biometric data based on identification of a baseline of biometric data for the user.

6. The apparatus of claim 1, wherein:
   the calibrator is further to calibrate the biometric data based on identification of one or more temporal segments in the biometric data; and
   the biometric rating generator is to generate separate ratings for the separate temporal segments identified by the calibrator.

7. The apparatus of claim 1, wherein the calibrator to adjust the biometric data based on social data includes to:
   determine one or more persons that are proximate to the user;
   determine an effect of the proximity of the one or more persons on the user; and
   adjust the biometric data to account for the effect of the proximity of the one or more persons on the user.

8. The apparatus of claim 7, wherein the biometric data receiver is to receive proximity information from the wearable device or another device utilized by the user or from one or more social media services.

9. The apparatus of claim 1, wherein the calibrator is to adjust the biometric data through:
   determination of an effect of the location on the user; and
   adjustment of the biometric data to account for the effect of the proximity of the location on the user.

10. The apparatus of claim 1, wherein:
    the biometric rating generator is to determine that an event is occurring at the location; and
    the biometric rating generator is to generate the rating for the event at the location.

11. The apparatus of claim 1, wherein the biometric rating generator is to generate the rating through modification of a previous rating for the location by the user based on the biometric data.

12. The apparatus of claim 1, wherein the biometric data comprises heart rate data for the user.

13. The apparatus of claim 1, wherein the rating is a numerical rating or a qualitative positive or negative rating.

14. A computer-implemented method, comprising:
    receiving, by a computing system, biometric data transmitted from a wearable device of a user;
    adjusting the received biometric data upwards or downwards based on social data of the user's location at a time of measurement of the biometric data;
    generating, by the computing system, a rating associated with the location visited by the user contemporaneously with measurement of the biometric data, wherein generating comprises generating the rating based at least in part on the received biometric data, as adjusted, and the location; and
    make the rating available to one or more other users.

15. The computer-implemented method of claim 14, further comprising identifying an event or a venue at the location based on a calendar event or social media information associated with the user.

16. The computer-implemented method of claim 14, wherein generating the rating comprises generating the rating for an event at the location.

17. One or more non-transitory computer-readable media containing instructions written thereon that, in response to execution by a computing system, cause the computing system to:
- receive biometric data transmitted from a wearable device of a user;
- adjust the received biometric data upwards or downwards based on social data of the user's location at a time of measurement of the biometric data;
- generate a rating associated with the location visited by the user contemporaneously with measurement of the biometric data, wherein generating comprises generating the rating based at least in part on the received biometric data and the location; and
- make the rating available to one or more other users.

18. The non-transitory computer-readable media of claim 17, further comprising instructions that when executed, cause the computing system to identify the location visited by the user.

19. The non-transitory computer-readable media of claim 17, further comprising instructions that when executed, cause the computing system to identify an event or a venue at the location based on a calendar event or social media information associated with the user.

20. The non-transitory computer-readable media of claim 17, wherein adjust the biometric data includes adjust the biometric data based on identification of a baseline of biometric data for the user.

21. The non-transitory computer-readable media of claim 17, wherein adjust the biometric data based on social data includes:
- determine an effect of the location on the user; and
- adjust the biometric data to account for the effect of the proximity of the location on the user.

22. The non-transitory computer-readable media of claim 17, wherein generate the rating comprises generate the rating for an event at the location.

23. The apparatus of claim 1, wherein, the calibrator adjusts the user's heart rate value upwards when the user is in the presence of a friend.

24. The computer-implemented method of claim 14, further comprising
adjusting the user's heart rate value upwards when the user is in the presence of a friend.

* * * * *